United States Patent [19]

Orita et al.

[11] Patent Number: 5,077,554
[45] Date of Patent: Dec. 31, 1991

[54] CONTROL SYSTEM FOR COMMUNICATION BETWEEN UNITS

[75] Inventors: Akira Orita, Yokohama; Akinori Kamijo; Kohei Ueki, both of Kawasaki; Takashi Hatano, Machida, all of Japan

[73] Assignee: Fujitsu Limited, Kawasaki, Japan

[21] Appl. No.: 142,998

[22] Filed: Jan. 12, 1988

[30] Foreign Application Priority Data

Jan. 12, 1987 [JP] Japan .................................. 62-3309

[51] Int. Cl.$^5$ .......................... H04L 1/00; H04L 5/14
[52] U.S. Cl. .......................... 340/825.02; 340/310 A; 370/35; 375/3
[58] Field of Search ............... 455/14, 15; 340/310 R, 340/310 A, 310 CP, 825.08, 825.18, 825.52, 825.02, 827; 379/4, 220, 221, 271, 273, 296, 338; 375/3; 370/35, 58.197, 85.6, 94.3, 94.1

[56] References Cited

U.S. PATENT DOCUMENTS

| | | | |
|---|---|---|---|
| 4,237,447 | 12/1980 | Clark | 340/825.02 |
| 4,250,489 | 2/1981 | Dudash et al. | 340/825.02 |
| 4,427,968 | 1/1984 | York | 340/825.02 X |
| 4,675,668 | 6/1987 | Ise et al. | 340/825.08 |
| 4,796,023 | 1/1989 | King | 340/825.02 |
| 4,823,111 | 4/1989 | Tsuchiya et al. | 340/825.02 X |

Primary Examiner—Ulysses Weldon
Attorney, Agent, or Firm—Staas & Halsey

[57] ABSTRACT

In control system for communication between units, each unit stores an adjacent-unit identifying number fixedly corresponding to each unit adjacent to one of the units, and forms a relative address, the relative address of the originating unit being "nil" and the relative address of the destination unit being expressed by a set of adjacent-unit identifying numbers of all units provided on the communication path between the originating unit and the destination unit, excluding the originating unit and including the destination unit, the signal message routing being executed in such a way that, when the received destination address is "nil", the unit receiving the message is determined to be the destination unit, and when the received destination address is not "nil", the unit receiving the message transfers the message to the next-stage unit, whereby a simple addressing process is realized.

14 Claims, 15 Drawing Sheets

Fig. 7

|     | P-No. | AD-No. |
|-----|-------|--------|
| CPR | $a_1$ | 2 |
|     | $a_2$ | 5 |

| | | |
|-----|-------|---|
| LPR$_1$ | $a_1$ | 1 |
| | $b_1$ | 2 |
| | $b_2$ | 3 |

| | | |
|-----|-------|---|
| LPR$_2$ | $a_2$ | 1 |
| | $c_1$ | 3 |
| | $c_2$ | 7 |

| | | |
|-----|-------|---|
| DLCC$_1$ | $b_1$ | 1 |

| | | |
|-----|-------|---|
| DLCC$_2$ | $b_2$ | 1 |

| | | |
|-----|-------|---|
| DLCC$_3$ | $c_1$ | 1 |

| | | |
|-----|-------|---|
| DLCC$_4$ | $c_2$ | 1 |

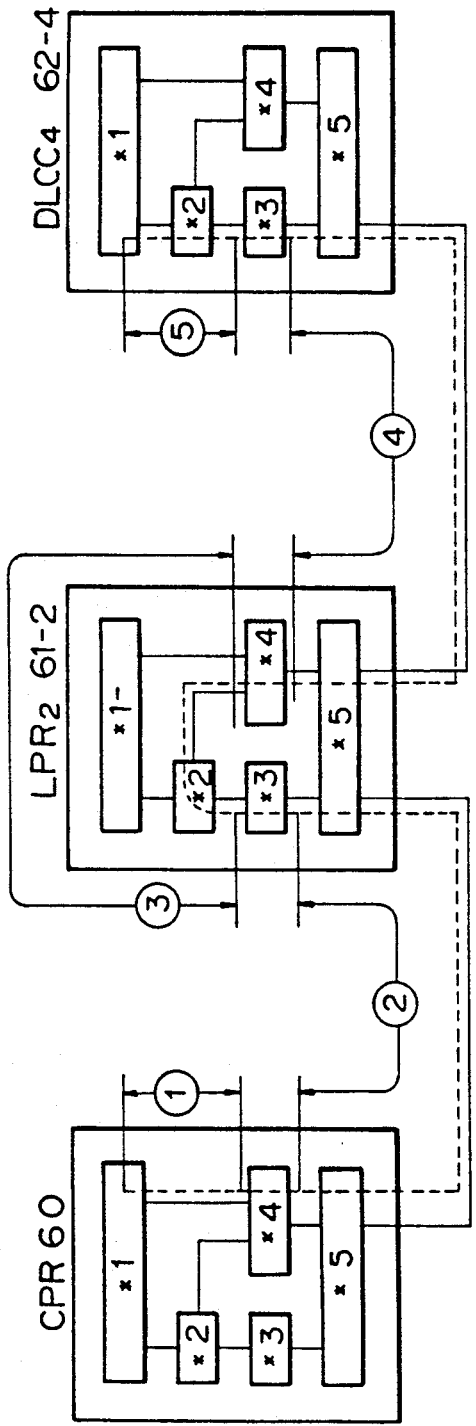
Fig. 8 EXAMPLE OF ADDRESS MODIFICATION
(COMMUNICATION FROM CPR VIA LPR₂ TO DLCC₄)
*1··· USER PART
*2··· DESTINATION ADDRESS TRANSLATING PART
*3··· ORIGINATING ADDRESS MODIFICATION PART
*4··· DESTINATION ADDRESS MODIFICATION PART
*5··· MTP

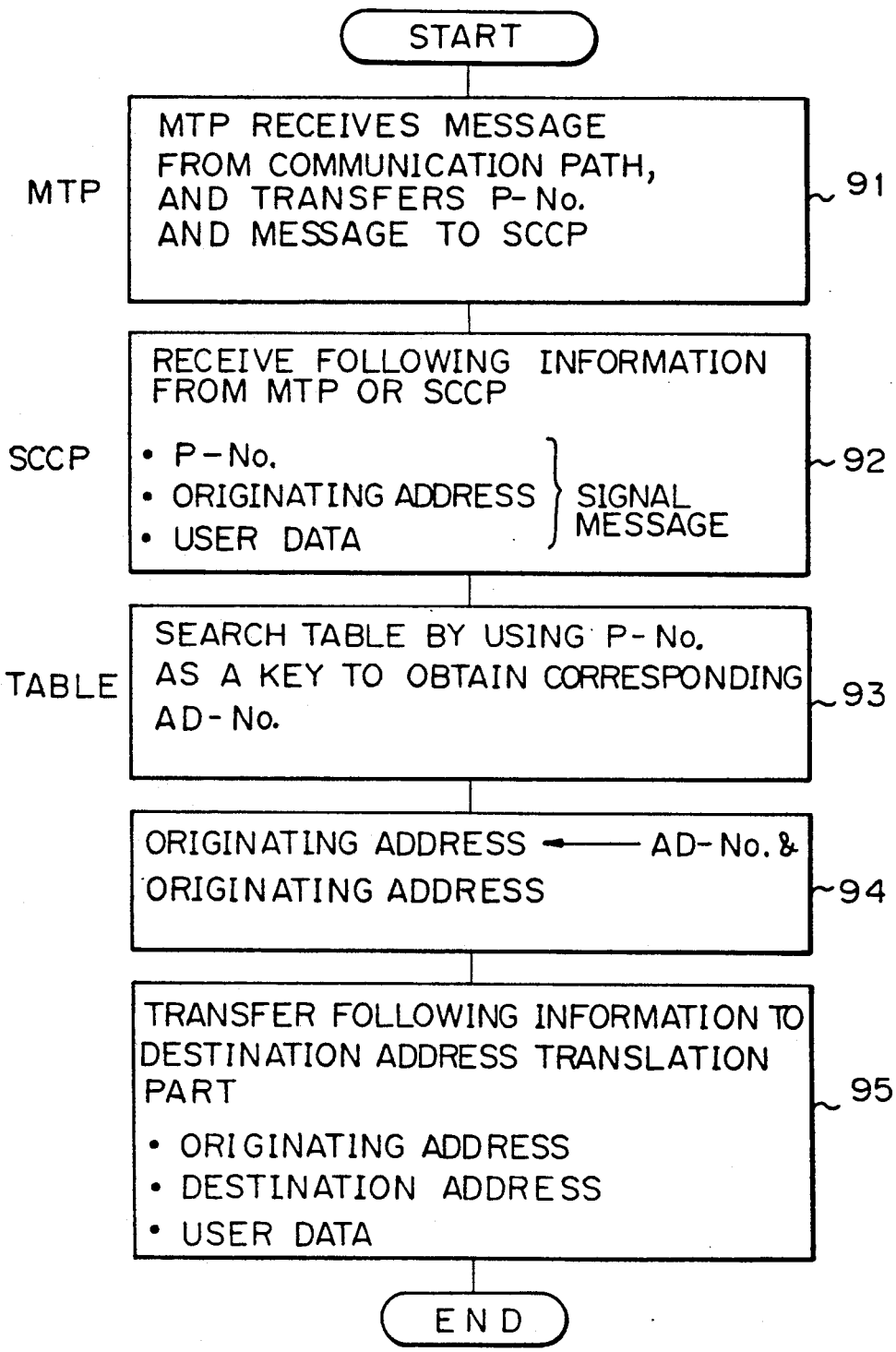

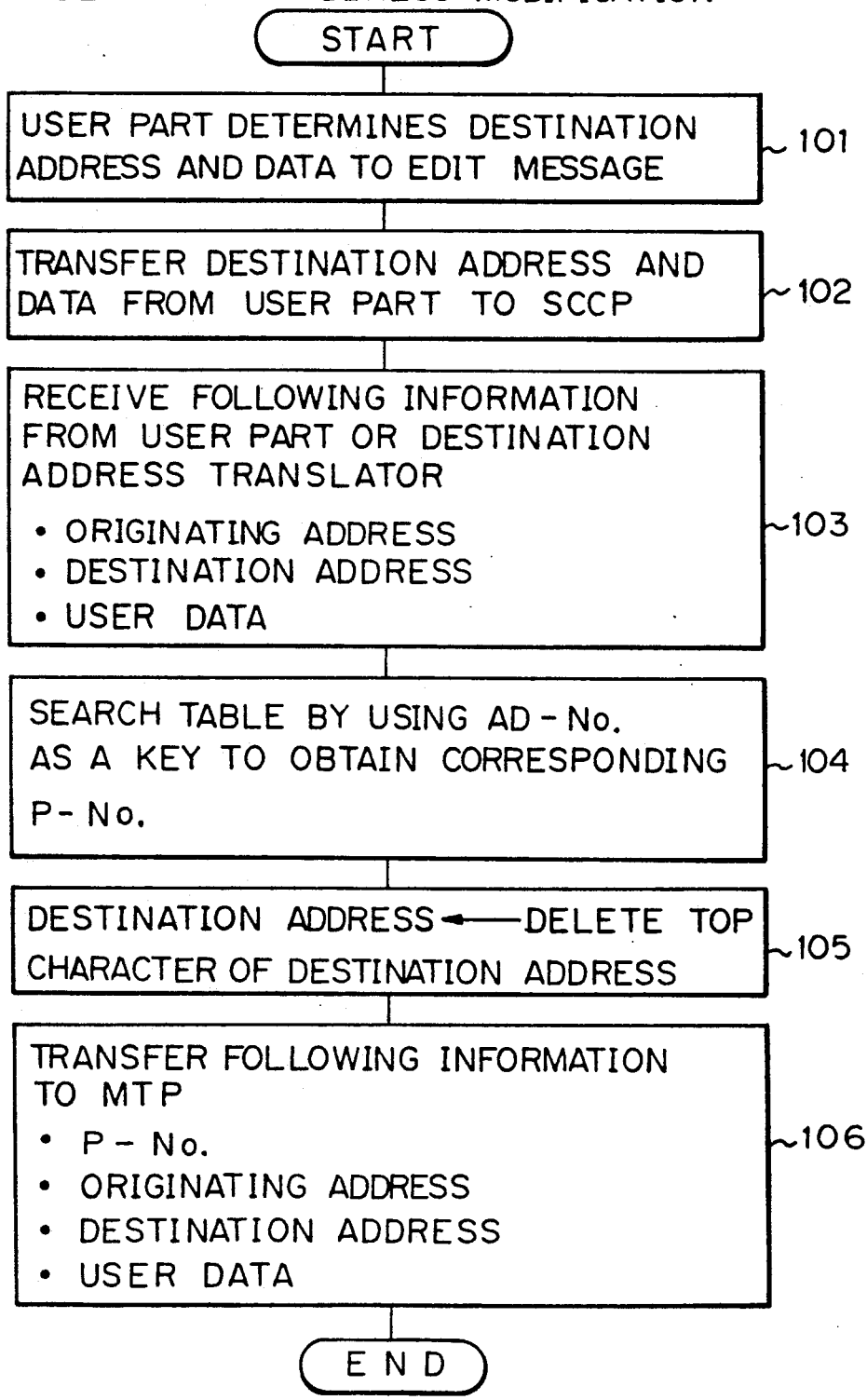

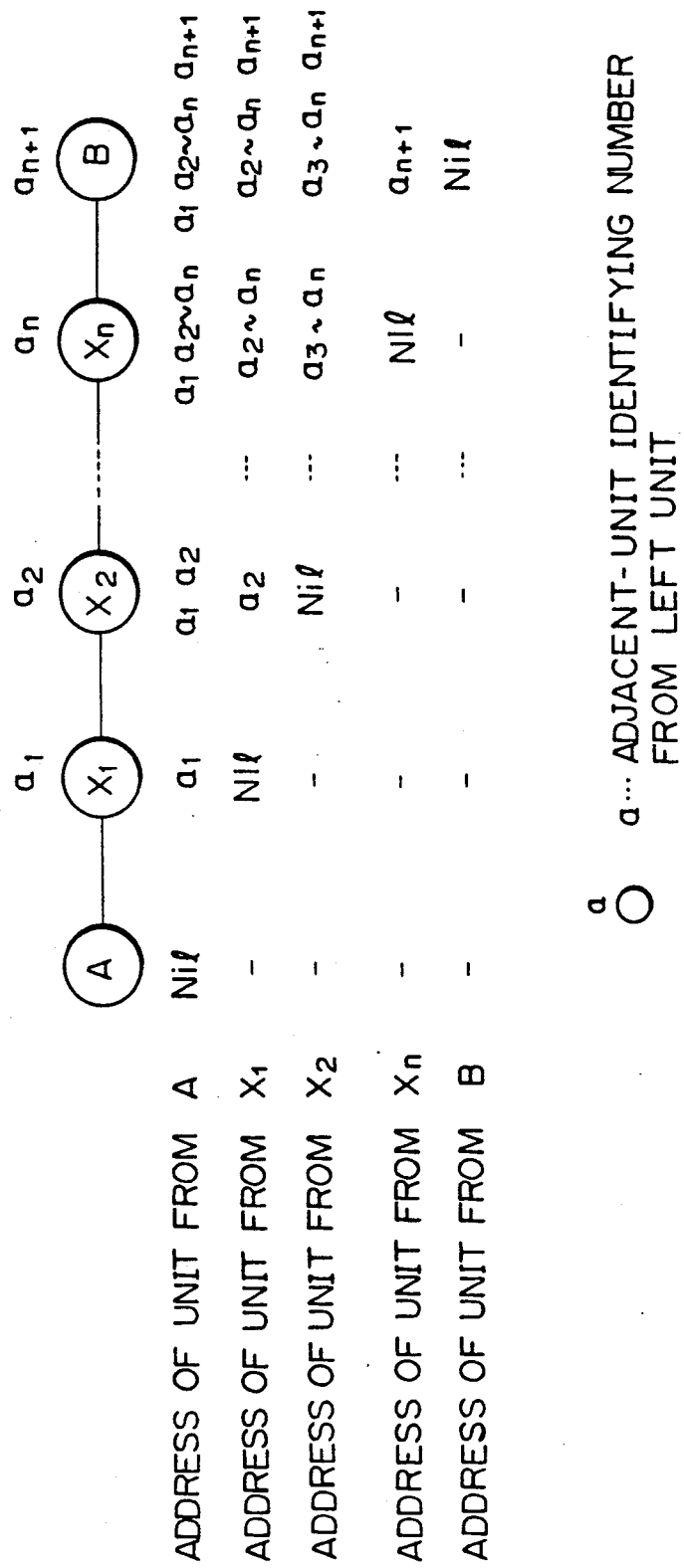

ADDRESS OF UNIT FROM 102 x — ADDRESS OF UNIT
y — ADJACENT-UNIT IDENTIFYING NUMBER

ADDRESS OF UNIT FROM 105

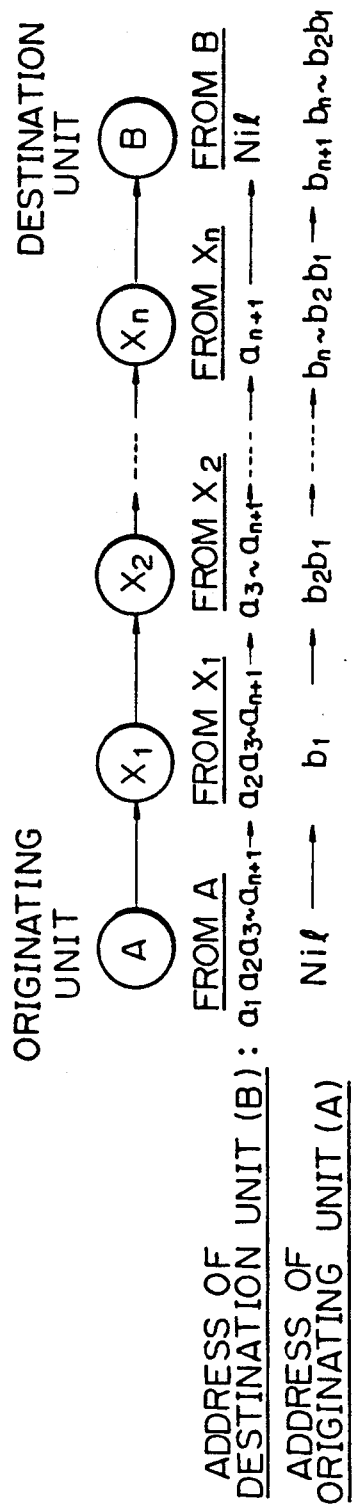

| ABSOLUTE ADDRESS | LINK |
|---|---|
| 2 | #1 |
| 4 | #1 |
| 5 | #1 |
| 3 | #2 |
| 6 | #2 |
| 7 | #2 |
| 8 | #2 |

5,077,554

CONTROL SYSTEM FOR COMMUNICATION BETWEEN UNITS

FIELD OF THE INVENTION

The present invention relates to a control system for communication between units, and more particularly, to a communication control system between units in a tree network wherein communication between desired units is possible by using a relative address.

When communication is carried out between units which are included in a communication system such as an exchange or which are connected to the exchange, an address of the originating unit and an address of the destination unit are transferred from the originating unit to the destination unit. The addition of new units or the building of a new exchange office necessitates a wider and more flexible usage of these addresses.

DESCRIPTION OF THE RELATED ARTS

In a conventional control system for communication between units or between offices, each unit is provided with an absolute address which has the same value in relation to any unit in the system. Each unit also has a complex translator in which a correspondence is previously made between each unit in the system and a link to be selected for communication. When a unit A receives a message including a destination address, the unit A refers to the translator to determine whether or not the destination address is the address of the unit A, and if not, to determine a link corresponding to the destination address.

In such a conventional system, however, because of the provision of the complex translator in which correspondences between all units in the system and links are respectively made, the following disadvantage occurs. That is, when an additional unit is introduced into the existing system, a new correspondence between the additional unit and a link to be selected must be added in the translator in all units in the system. Therefore, the addition of a unit into the existing system forces the system designer to carry out very complex procedures. The same problem arises when an additional exchange office is introduced into an existing exchange network.

SUMMARY OF THE INVENTION

An object of the present invention is, to simplify in communication control system a new system design required upon an installation of a new unit or a new exchange office introduced into an existing system. This is accomplished by providing a relative address to each unit for communication, and by carrying out a routing based on the relative address, thereby allowing the complex translator to be omitted from each unit, and therefore, enabling the omitting of additional correspondence between the additional unit and a link to be selected, in each unit except for the units directly connected to the additional unit, even upon an installation of a new unit or a new exchange introduced into the existing system.

To attain the above object according to the invention, there is provided a control system for communication between units, in a communication system having a tree network and including a plurality of units each having a communication facility.

Each of the plurality of units comprises, in relation to a unit originating a communication, a destination address forming means; and a signal message routing means.

The destination address forming means comprises: a storing means for storing an adjacent-unit identifying number fixedly corresponding to each unit adjacent to one of the plurality of units; and a relative address forming means for making a relative address of one of the plurality of units equal to "Nil", and for generating a destination address, in relation to the unit originating the communication. The destination address is represented by a set of adjacent-unit identifying numbers of all units provided on the communication path between one of the plurality of units and the destination unit excluding the unit originating the communication but including the destination unit.

The signal message routing means comprises: a destination determining means for determining that one of the plurality of units is the destination unit when the destination address in the received message signal is "Nil"; a path selecting means for selecting, based on the received destination address, a path by which the received message signal is to be sent when the one of the plurality of units is not the destination unit; and an address changing means for changing the received originating address into an originating address in relation to the one of the plurality of units.

According to another aspect of the invention, the communication system having said tree network is an exchange system, and the plurality of units includes: a call processing unit for controlling a network; a line processing unit under the control of the call processing unit, provided to correspond to a plurality of subscriber lines; and a line control unit under the control of the line processing unit, for controlling each of the subscriber lines.

The line processing unit, the line control unit, and the call processing unit are connected via links for communication. Communication between the call processing unit and the line processing unit or between the call processing unit and the line control unit is effected by using the relative address.

According to still another aspect of the present invention, the relation between the link and the relative address is determined by using a translation table, where the link is provided between the call processing unit and the line processing unit or between the call processing unit and the line control unit.

According to a still further aspect of the invention, the relation between the link and the relative address is provided with a certain logic, whereby, the link number of the path selected by the path selecting means is determined by adding a constant value to or by subtracting a constant value from the relative address.

According to a still further aspect of the invention, there is provided a control system for communication between units in a communication system for carrying out a communication between a main control unit and a plurality of units under the control of the main control unit, the units being connected in a tree structure with the main control unit as a center thereof.

The main control unit comprises: a managing means for managing a plurality of units directly connected to the main control unit and a plurality of units indirectly connected through the directly connected units by using a set of relative numbers respectively provided to the directly connected units and the indirectly connected units; and a sending means for sending a destination address included in a signal message sent from the main control unit. The destination address is expressed by a set of the relative addresses of the units on the connection path, excluding the unit directly connected to the main control unit.

Each of the units relaying the signal message comprises: a discriminating means for discriminating whether or not the received destination address is Nil, to determine whether or not the destination of the signal message is at the unit under consideration; and a destination address transferring means for transferring a modified destination address to the next-stage unit when the discriminating means discriminates that the destination of the signal message is not the unit under consideration. The modified destination address is formed by deleting the relative address of the next-stage unit from the received destination address.

According to a still further aspect of the invention, the main control unit comprises a transferring means for transferring a signal message including an originating address equal to Nil. Each of the units relaying the signal message comprises an originating address modification means for generating a modified originating address by adding "1" to the received originating address. The modified originating address is transferred to the next-stage unit.

According to a still further aspect of the invention, each of the units relaying the signal message comprises a response means for sending response information to the main control unit. The response information includes a response destination address having a destination at the main control unit. The response destination address is made equal to the received originating address.

According to a still further aspect of the invention, the response destination address is formed by a set of "1"s, the number of "1"s being equal to the number of units between the response unit and the main control unit, excluding the response unit and including the main control unit.

According to a still further aspect of the invention, the response information includes a response originating address and a received link number. The response originating address generated from the destination unit is "Nil". Each of the units relaying the signal message comprises a response originating address modification means for generating a modified response originating address by adding a number to the received response originating address, the number being obtained from a translation table storing a correspondence between a received link number and the number.

According to a still further aspect of the invention, the modified response originating address is generated by adding a constant number to the received response originating address; this number being obtained by adding a constant number to or subtracting a constant number from the received link number included in the response information.

BRIEF DESCRIPTION OF THE DRAWINGS

The above object and features of the present invention will be more apparent from the following description of the preferred embodiments with reference to the accompanying drawings, wherein:

FIG. 7 shows an example of translating tables provided in respective units shown in FIG. 6;

FIG. 8 is a diagram explaining the modification of the originating address and the destination address, according to an embodiment of the present invention;

FIG. 9 is a flow chart showing a process flow in a originating address modification part in a unit shown in FIG. 8;

FIG. 10 is a flow chart showing a process flow in a destination address modification part in a unit shown in FIG. 8;

FIG. 11 is a diagram explaining the modifications of the destination address and the originating address, according to an embodiment of the present invention;

FIG. 13 is a diagram explaining the address modification, according to an embodiment of the present invention;

DESCRIPTION OF THE PREFERRED EMBODIMENTS

For a better understanding of the present invention, a conventional communication control system will first be described with reference to FIGS. 16 and 17.

Figures 16, 17:
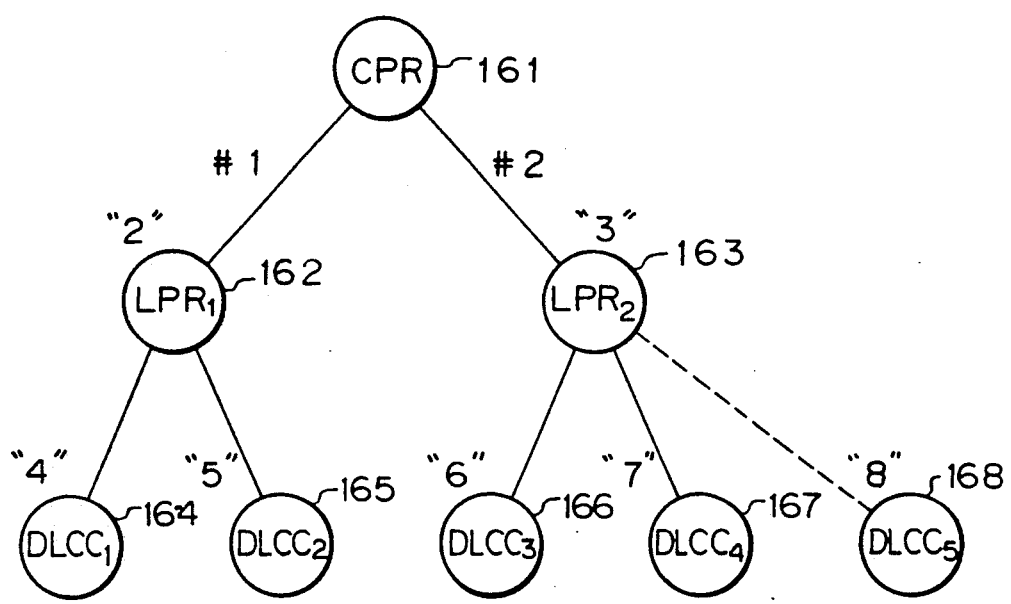
FIG. 16 shows a conventional communication control system.
FIG. 17 is an example of a complex translator in a conventional processing unit.

FIG. 16 shows a conventional communication control system including a plurality of units 161 to 167. The unit 161 is a call processing processor (CPR); the units 162 and 163 are line processors ($LPR_1$ and $LPR_2$); and the units 164-167 are digital line control circuits ($DLCC_1$ to $DLCC_4$). Each unit conventionally has an absolute address. That is, in the figure, the units 161 to 167 respectively have absolute addresses "1" to "7". Each unit also has a translator, in other words a control data, in which the absolute address of each unit in the system is made to correspond to a link to be selected when the unit is a destination of a message.

FIG. 17 is an example of the complex translator in the conventional call processing processor (CPR) 161. As will be seen from the figure, when the absolute address "2", which is the address of the $LPR_1$, is the destination, a link #1 is selected; when the absolute address "4", which is the address of the $DLCC_1$, is the destination, the link #1 is also selected; and when the absolute address "7", which is the address of the DLCC4, is the destination, a link #2 is selected.

The remaining units 162 to 167 are provided with similar translators, respectively.

The disadvantage of the above-described conventional communication system is that, when an additional unit such as a digital line control circuit (DLCC5) 168 is introduced into the system as shown in FIG. 16, the translators in all existing units must be changed. That is, in the translator in the call processing processor (CPR) 161, for example, the correspondence between the absolute address of the additional unit 168 and the link to be selected must be added. Similar modifications must be made to the remaining translators in the other units, and these modifications of the translators force a system designer to carry out very complex procedures.

Embodiments of the present invention will now be described.

Figure 1:
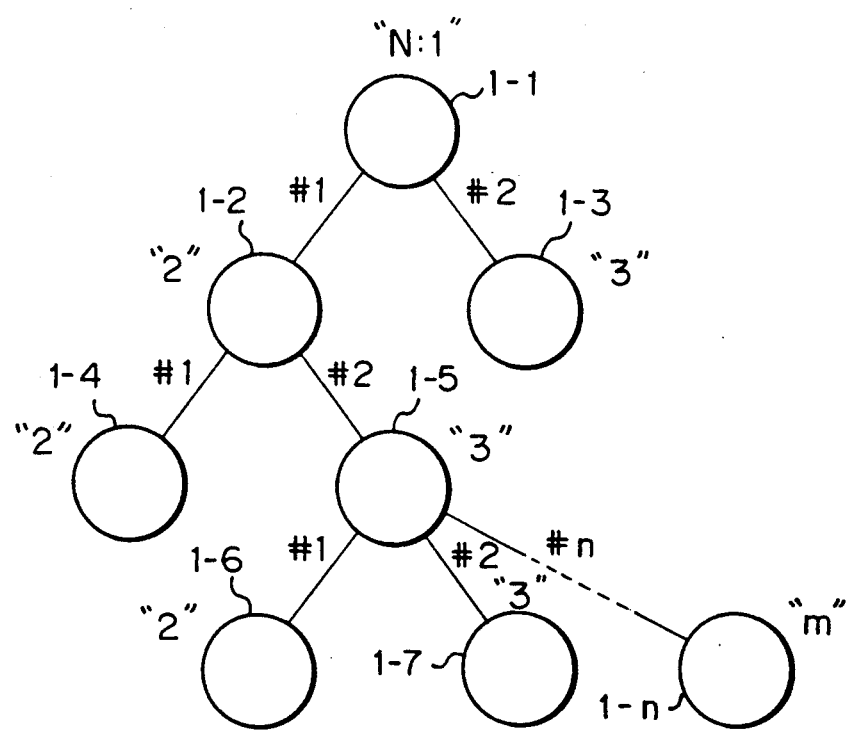
FIG. 1 is a diagram of an example of a communication system applied to the present invention.

FIG. 1 is a diagram of an example of a communication system applied to the present invention. In FIG. 1, the communication system is an exchange system having a tree network in which there is one and only one path between any two nodes and including a plurality of units 1—1 to 1-n each having a communication facility.

Figure 2:
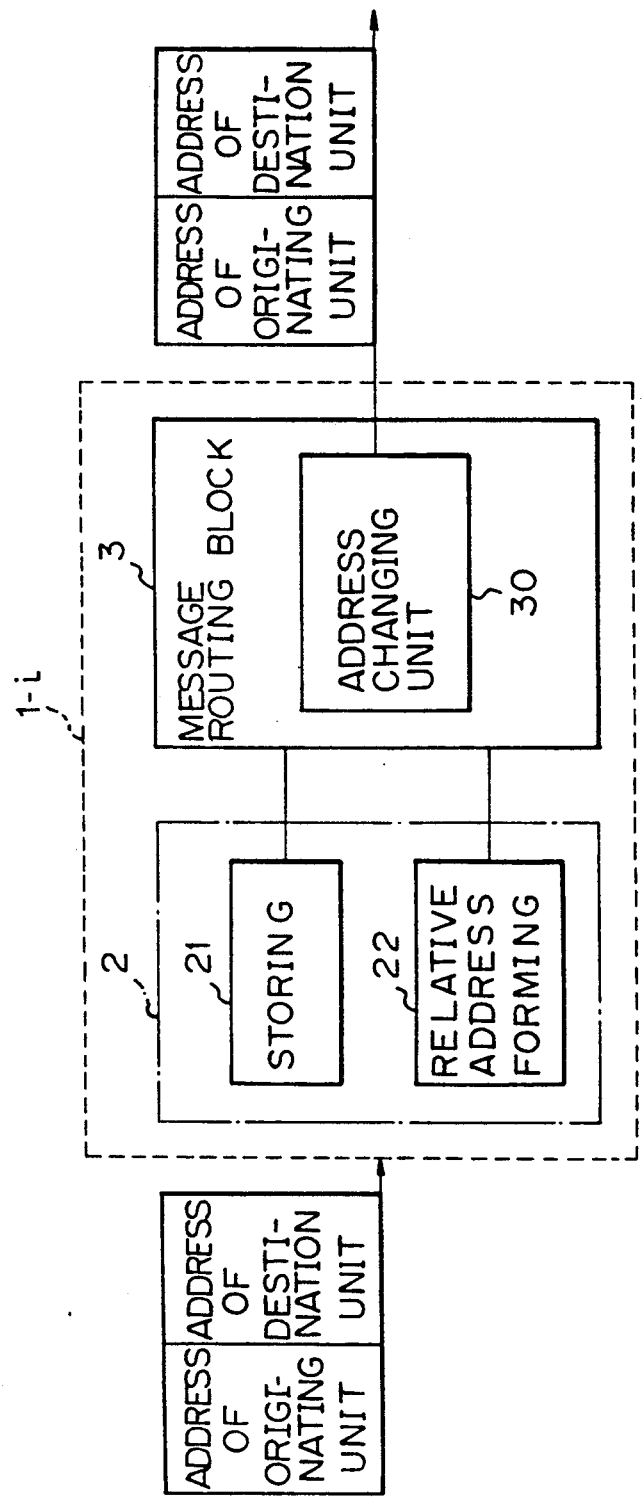
FIG. 2 is a block diagram showing a general construction of each unit in the system shown in FIG. 1, according to the present invention.

FIG. 2 is a block diagram showing a general construction of each unit 1-i, where i=1, 2, . . . , or n. As shown in the figure, the unit 1-i receives a signal message including a relative address consisting of an address of an originating unit and an address of a destination unit, and outputs a new relative address consisting of the address of an originating unit and the address of a destination unit. The unit 1-i includes a destination address forming block 2 and a signal message routing block 3.

The destination address forming block 2 includes a storing unit 21 for storing adjacent-unit identifying numbers, and a relative address forming unit 22 for forming a relative address of the originating address and the destination address.

The adjacent-unit identifying numbers are previously and fixedly determined to correspond to the unit 1-i under consideration. For example, two units 1-2 and 1-3 are connected to the unit 1—1 through links #1 and #2 respectively. In relation to the unit 1—1, the address of the unit 1—1 is always determined as "1"; the address of the adjacent unit 1-2 is fixedly determined as, for example, "2", which fixedly corresponds to the link #1; and the address of the other adjacent unit 1-3 is also fixedly determined as, for example, "3", which fixedly corresponds to the link #2. Similarly, in relation to the unit 1-2, the address of the unit 1-2 is "2"; the address of the adjacent unit 1-4 is "Nil"; and the address of the other adjacent unit 1-5 is "3". The address of unit 1—1 is "1" in relation to unit 1-2 and is also "1" in relation to unit 1-3; and the address of unit 1-5 is "1" in relation to unit 1-6, unit 1-7 . . . unit 1-n. Therefore, the storing unit 21 in the unit 1—1 stores the adjacent-unit identifying numbers "2" and "3". Similarly, the storing unit 21 in the unit 1-2 stores the adjacent-unit identifying numbers "1", "2", and "3".

The destination address in the relative address is expressed by a set of adjacent-unit identifying numbers of the units provided along the communication path between the unit under consideration and the destination unit, including the destination unit and excluding the unit under consideration. For example, when the originating unit is unit 1—1 and the destination unit is unit 1-4, the destination address in relation to the unit 1—1 is expressed by a set "22"; and the destination address in relation to the unit 1-2 is expressed by a set "2".

When the originating unit is unit 1-4 and the destination unit is unit 1—1, the destination address in relation to unit 1-4 is expressed by a set of "11".

When the originating unit is unit 1-4 and the destination unit is unit 1-3, the destination address in relation to unit 1-4 is expressed by a set of "113".

The message routing block 3 includes an address changing unit 30 by which, when the destination address in the received message is "Nil", the unit 1-i under consideration is determined to be the destination unit; and, when the received destination address is not "Nil", a link for transferring the message is selected, the received originating address is changed to a new originating address, in relation to the unit 1-i under consideration, and the received destinating address is changed to a new destination address in relation to the next stage unit.

In operation, since each unit employs relative addresses in relation to the unit under consideration, identify the other units, and since the address of the unit under consideration is determined to be "Nil" for every unit, the destination address received by the destination unit is always "Nil" for all units. Therefore, whether or not the received signal message is received by the destination unit can be determined by a fixed logic of whether or not the received destination address is "Nil".

That is, a unit, which relays the signal message to the next-stage unit, selects a link and then changes the received destination address to a new destination address in relation to the next-stage unit. Similar selections and changes are effected step by step at each unit provided along the communication path, and thus the unit receiving the destination address "Nil" is determined to be the destination unit.

Figure 3:
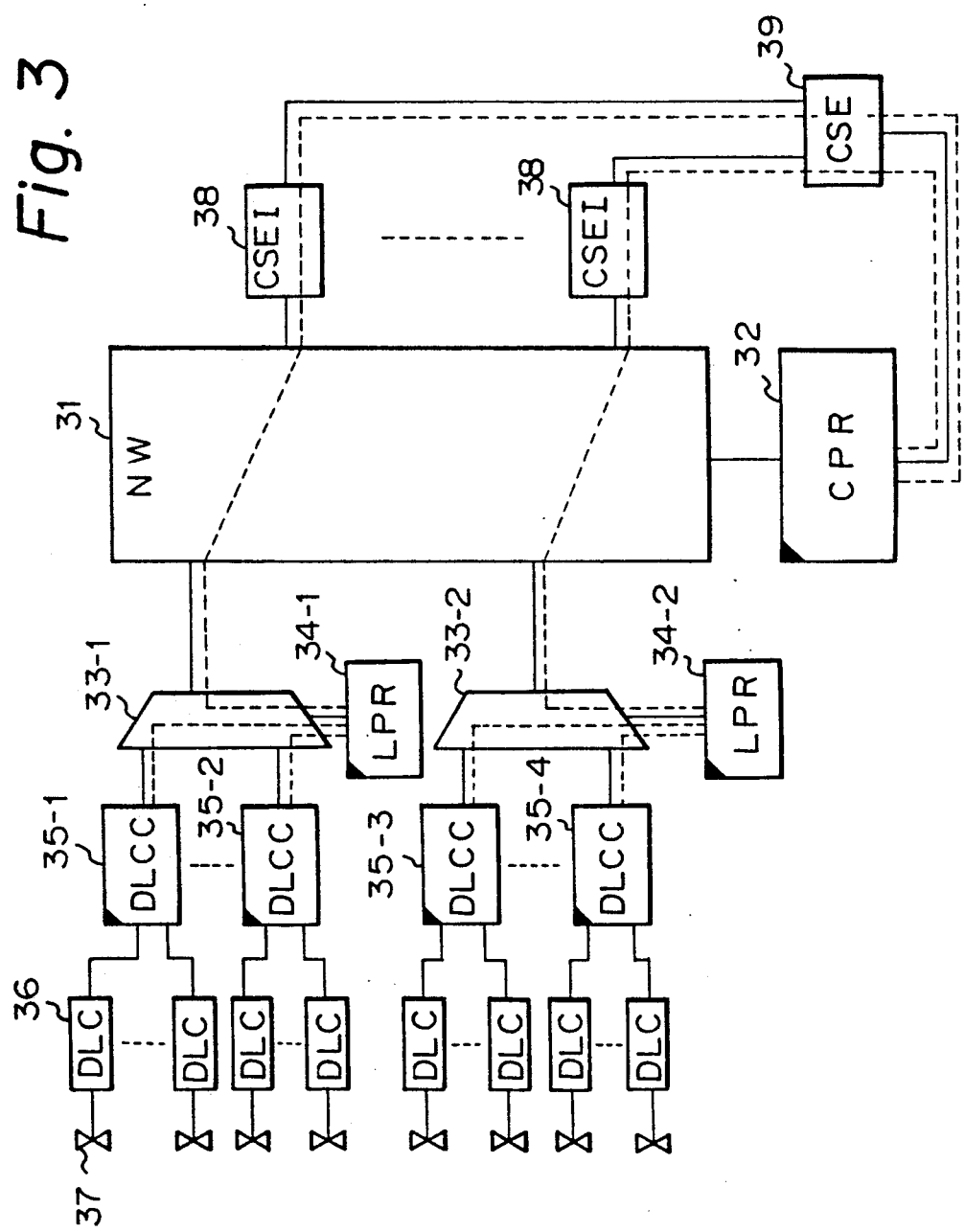
FIG. 3 is a block diagram showing an example of a communication control system applicable to an embodiment of the present invention.

FIG. 3 is a block diagram showing an example of a communication control system applicable to an embodiment of the present invention.

In FIG. 3, reference numeral 31 represents a network (NW); 32 a call processing processor (CPR); 33-1 and 33-2 multiplexing units; 34-1 and 34-2 line processing units (LPR); 35-1 to 35-4 digital line-control circuit units (DLCC); 36 a plurality of digital line circuits (DLC); 37 subscriber terminals; 38 common channel signaling equipment interfaces (CSEI); and 39 a common channel signaling equipment (CSE).

The network (NW) 31 performs an exchange operation on the outputs of the multiplexing units 33-1 and 33-2 under the control of the call processing processor 32. The multiplexing units 33-1 and 33-2 respectively multiplex the outputs of the digital line control circuits (DLCC) 35-1 and 35-2, and 35-3 and 35-4, under the control of the line processing units (LPR) 34-1 and 34-2. A plurality of the digital line circuits (DLC) 36 are connected to the inputs of each digital line control circuit units (DLCC). One of the subscriber terminals 37 is connected to the input of each digital line circuit (DLC).

The outputs of the network (NW) 31 are connected through the common channel signaling equipment interface (CSEI) 38 to the common channel signaling equipment (CSE) 39.

The subjects of the communication between units, carried out in the embodiments of the present invention, are the call processing processor (CPR) 32, the line processors (LPR) 34-1 and 34-2, and the digital line control circuit units (DLCC) 35-1 to 35-4, all of which are represented in the figure by black triangles at the corners thereof. The transferring paths of the message are shown in the figure by dash lines.

Figure 4:
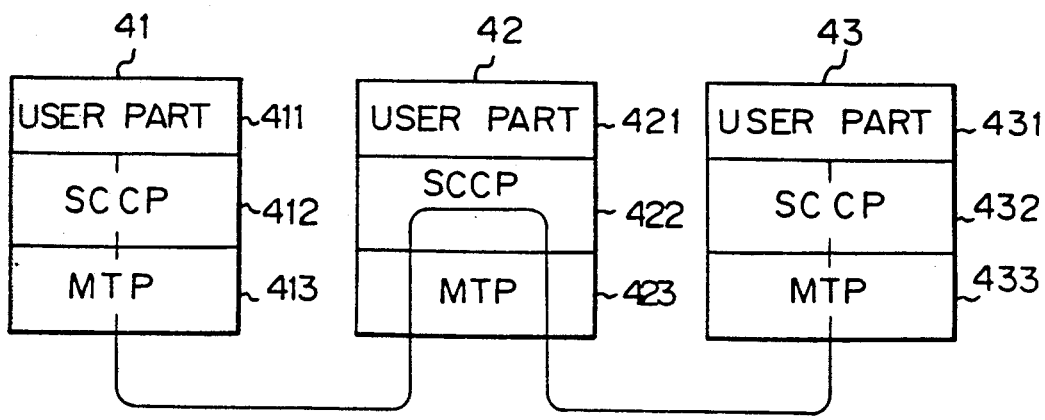
FIG. 4 is a diagram explaining a message transfer through the units, according to an embodiment of the present invention.

FIG. 4 is a diagram explaining the message transfer through the units which are the subject for the communication as shown in FIG. 3. In FIG. 4, 41, 42 and 43 are units which include user parts 411, 421 and 431, signal connection control parts (SCCP) 412, 422 and 432, and message transfer parts (MTP) 413, 423 and 433, respectively.

The user parts 411, 421 and 431 are functional parts for transmitting messages to, and receiving messages from, the message transfer part. Plural user parts are provided for each function, such as a maintenance/operation program control or subscriber terminal connection control, to carry out a signal processing of the same function.

The signal connection control parts (SCCP) 412, 422 and 432 are for carrying out message routing processings.

The message transfer parts (MTP) 413, 423 and 433 carry out signal link controls in a inter-unit communication.

As a communication protocol between the units subject to communication, the CCITT No. 7 signal system is employed in this embodiment. In the inter-unit communication as shown in FIG. 3, the signal connection and control parts (SCCP) 2, 422 and 432 play an important role in the addressing and message routing.

In the communication between offices, the message transferring parts (MTP) 413, 423 and 433 take the initiative in the addressing and message routing.

In the following, an embodiment of the control system for communication between units in the case of an inter-office communication is described.

Figure 5:
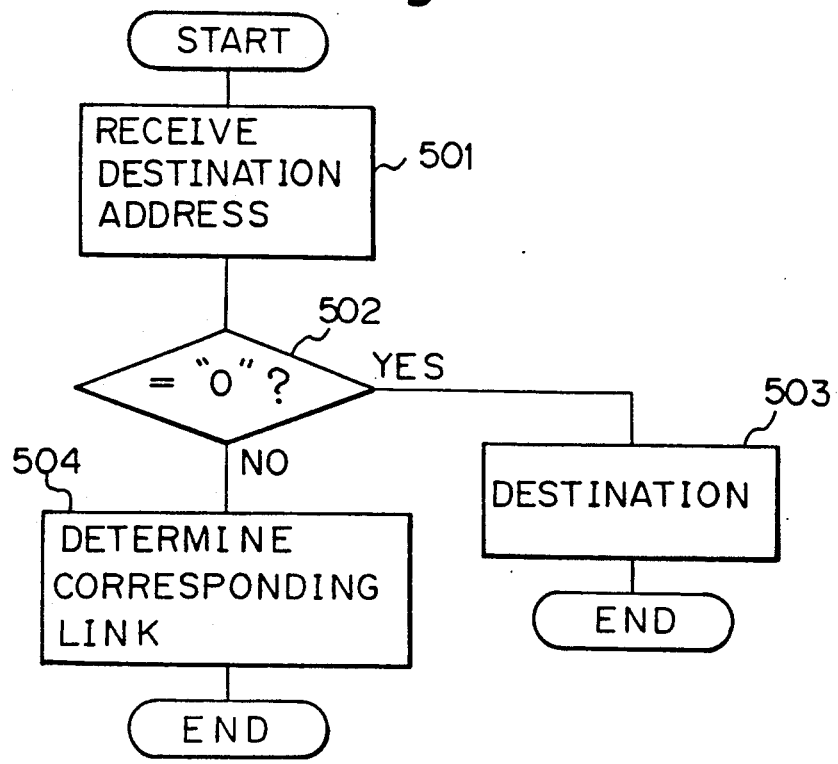
FIG. 5 is a flow chart explaining the operation at the signal connection control part (SCCP), according to an embodiment of the present invention.

FIG. 5 is a flow chart explaining the operation at the signal connection control part (SCCP) 412, 422 or 432. As shown in FIG. 5, at step 501, the SCCP receives the destination address from the user part in the unit. At step 502, it is determined whether or not the received destination address is equal to "Nil". If the address is equal to "Nil", then at step 503, the unit which received the destination address equal to "Nil" is determined to be destination. If the address is not equal to "Nil", then at step 504, the SCCP determines a corresponding link through which the message is to be transferred.

Figure 6:
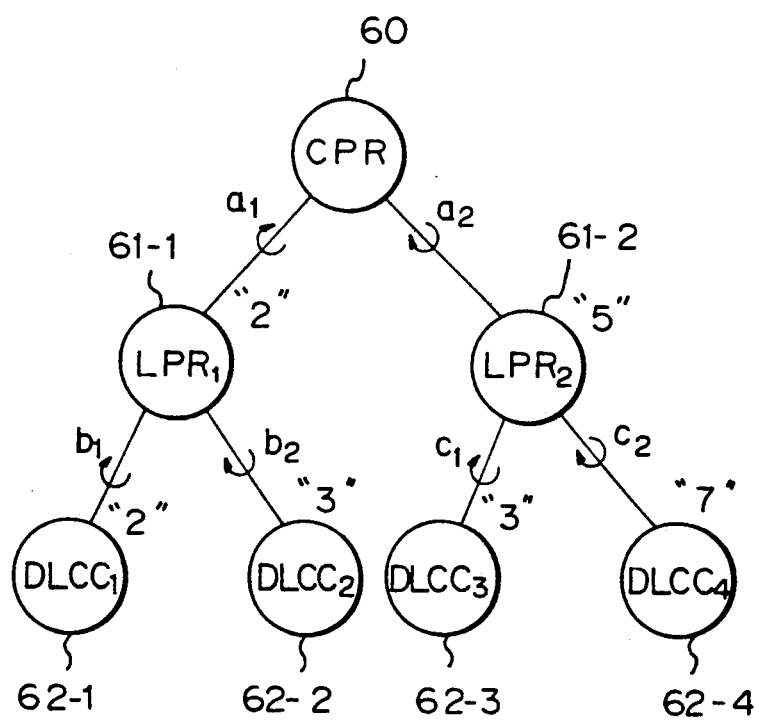
FIG. 6 is a diagram explaining the control system for communication between units, according to an embodiment of the present invention.

FIG. 6 is a diagram explaining the control system for communication between units, according to the embodiment of the present invention. In FIG. 6, an office is provided with a call processing unit (CPR) 60, two line processing units (LPR) 61-1 and 61-2, and four digital line control circuit units (DLCC) 62-1 through 62-4. The communication is carried out in this example from the CPR to one of the units. A numeral, provided on the upper right of a circle representing each unit, is a relative address in relation to the original unit, i.e., the adjacent-unit identifying number. The adjacent-unit identifying number of the upper unit in relation to the receiving unit is not illustrated in the figure, but is, for example, "1" at each unit. For example, the numeral "5" provided at the upper right of the LPR$_2$ 61-2 is the address of the LPR$_2$ relative to the CPR, i.e., the adjacent-unit identifying number of the LPR$_2$ relative to the CPR. Also, the numeral "7" provided at the upper right of the DLCC$_4$ is the address of the DLCC$_4$ relative to the LPR$_2$.

The symbols "a$_i$", "b$_i$", and "c$_i$" of the links connecting the two units are link-identifying numbers representing the physically-accommodated positions of the communication paths. The signal connection control part (SCCP) in each unit has a simple translating table in which the correspondence between each adjacent-unit identifying number and the corresponding link identifying number is stored and memorized. By referring to the translating table, the originating address and the destination address are changed by a later described method.

FIG. 7 shows the translating tables provided in respective units shown in FIG. 6. In FIG. 7, the CPR stores two path-identifying numbers (P-No.) a$_1$ and a$_2$ and two adjacent-unit identifying numbers (AD-No.) "2" and "5" corresponding respectively to the numbers a$_1$ and a$_2$. This means that the CPR 60 shown in FIG. 6 is connected through the path a$_1$ to a unit having the adjacent address "2", and is connected through the path a$_2$ to a unit having the adjacent address "5".

Similarly, the LPR$_1$ stores three path-identifying numbers (P-No.) a$_1$, b$_1$ and b$_2$ and three adjacent-unit identifying numbers (P-No.) "1", "2" and "3" corresponding to the numbers a$_1$, b$_1$ and b$_2$, respectively. This means that the LPR$_1$ 61-1 shown in FIG. 6 is connected through the path "a$_1$" to the unit having the adjacent address "1", is connected through the path "b$_1$" to the unit having the adjacent address "2", and is connected through the path "b$_2$" to the unit having the adjacent address "3". The adjacent address "1" means that the upper unit for the LPR$_1$ 61-1 is the CPR 60 connected to the LPR$_1$ 61-1 via the link a$_1$.

The translating table in the LPR$_2$ is similar to that in the LPR$_1$.

The DLCC$_1$ through DLCC$_4$ are end units, as shown in FIG. 6, and therefore, a single path is connected to each of the units. All units connected to the units DLCC$_1$ through DLCC$_4$ are originating units in relation to these units DLCC$_1$ through DLCC$_4$. Therefore, the adjacent-unit identifying numbers for these units DLCC$_1$ through DLCC$_4$ are "1".

Although the above embodiment employs the simple tables shown in FIG. 7, the present invention is not restricted to the above. For example, instead of employing these tables, the SCCP may calculate the corresponding path-identifying number based on the received adjacent-unit identifying number, in accordance with a predetermined fixed logic. That is, the corresponding adjacent-unit identifying number is determined by adding a constant number to or by subtracting a constant number from the received adjacent-unit identifying number.

FIG. 8 is a diagram explaining a modification of the originating address and the destination address when the CPR 60 in FIG. 6 is the originating unit and the DLCC$_4$ 62-4 in FIG. 6 is the destination unit. In FIG. 8, each of the units CPR 60, LPR$_2$ 61-2 and DLCC$_4$ 62-4 includes the user part *1, the signal connection control part including a destination address translating part *2, an originating address modification part *3, a destination address modification part *4, and the message transferring part (MTP) *5. The transfer path for the message is illustrated by a dash line.

FIG. 9 is a flow chart showing a process flow in the originating address modification part *3; and FIG. 10 is a flow chart showing a process flow in the destination address modification part *4.

Referring to FIGS. 8 to 10, in an interval ①  between the user part *1 and the destination address modification part *4 in FIG. 8, the user part *1 in the CPR 60 determines the destination address "57" and user data (step 101 in FIG. 10). The destination address "57" in this example is a set of adjacent-unit identifying numbers of all units provided on the path between the originating unit CPR 60 and the destination unit DLCC$_4$ 62-4, excluding the CPR 60 and including the DLCC$_4$ 62-4; i.e., in this example, a set of adjacent-unit identifying numbers of the units LPR$_2$ 61-2 and DLCC$_4$ 62-4. The user part *1 in the CPR 60 also determines the originating address to be Nil, which is no number in an address field in a message (see FIG. 8), which means that the CPR 60 is an originating unit.

The destination address "57", the user data, and the originating address are transferred from the user part *1 to the destination address modification part *4 in the SCCP, as shown by the steps 102 and 103 in FIG. 10.

In the destination address modification part *4 in the CPR 60, a search is made in the translation table shown in FIG. 7 by using the head number "5" in the destination address as a key, to obtain the corresponding path-identifying number a$_2$, as shown by step 104 in FIG. 10. Then, as shown in step 105 in FIG. 10, the head number "5" is deleted from the destination address to obtain a new destination address "7".

The message including the originating address Nil and the new destination address "7" is transferred through an interval ② to the message transferring part *5 in the LPR$_2$ 61-2. The message transferring part *5 transfers the path-identifying number a$_2$ and the message to the originating address modification part *3 in the LPR$_2$ 61-2 (steps 91 and 92 in FIG. 9). In the originating address modification part *3, the originating address Nil is changed to "1", which is the adjacent-unit identifying number of the originating unit CPR 60 in relation to the LPR$_2$ 61-2. This change is effected by searching the translating table of the LPR$_2$ shown in FIG. 7 using the path-identifying number a$_2$ as a key, to obtain the corresponding adjacent-unit identifying number "1", as shown in step 93 in FIG. 9; and then, as shown in step 94 in FIG. 9, the above-described adjacent-unit identifying number "1" and the originating address Nil is combined as a set indicating the new originating address.

The thus-obtained originating address, destination address, and user data are transferred from the originating address modification part *3 to the destination address translation part *2 in the LPR$_2$ 61-2 (step 95 in FIG. 9). The destination address translation part *2 discriminates whether or not the received destination address is Nil. If the received destination address is Nil, the destination unit is determined to be the immediate receiving unit. If the received destination address is not Nil, the message is transferred to the next-stage unit. In the example shown in FIG. 8, the destination address received in the destination address translation part *2 in the LPR$_2$ 61-2 is "7", which is not Nil, and therefore, the part *2 in the LPR$_2$ 61-2 transfers the message to the destination address modification part *4.

The destination address modification part *4 executes the steps 104 and 105 so that the destination address "7" is changed to Nil.

The thus-obtained originating address "1" and the destination address Nil are transferred through an interval ④ and the message transferring part *5 in the DLCC$_4$ 62-4 to the originating address modification part *3 in the DLCC$_4$ 42-4, and steps 91 through 94 in FIG. 9 are executed as described before. As a result, the originating address is changed from "1" to "11". Since the destination address received by the destination address translation part *2 in the DLCC$_4$ 62-4 is Nil, the part *2 determines that the destination unit is the DLCC$_4$ 62-4, and thus the part *2 transfers the message data to the user part *1 in the DLCC$_4$ 62-4. In the user part *1, since the received originating address is "1", it is determined that the originating part is the CPR 60.

As described above, since the destination address translation unit *2 in each unit transfers the message if the received destination address is not Nil, and determines that the unit now receiving the message is the destination unit if the received destination address is Nil, the destination address translation unit *2 does not need to translate the absolute address as in the conventional system. Therefore, even when an additional unit is provided, the translation table in FIG. 7 in each unit does not need modification, except for the units adjacent to the additional unit.

As will be apparent from the above description, the most important feature of the present invention is the provision of the relative address to each unit in the office. In the following, the method of providing the relative addresses is described in a general way.

Namely, in an inter-unit communication network, the addressing of each unit is a relative addressing method in which the root of the tree is selected to be the unit which recognizes the addresses of the adjacent units. The addressing is carried out under the following conditions:

(1) In relation to each unit, adjacent-unit identifying numbers are provided to all of the units adjacent to the unit under consideration. Assume that the unit under consideration is referred to as a unit A, then the adjacent units are an upper unit and lower units. The adjacent-unit identifying number "1" is fixedly provided to the upper unit.

One of the numbers 2 to 254 is provided to each of the lower units as an adjacent-unit identifying number. The unit A determines the correspondence between the adjacent-unit identifying number and the physically-accommodated position of the signal link, that is, the communication-path identifying number (see the translation table shown in FIG. 7). Therefore, when a unit receives a signal message including a signal link, the unit can obtain an adjacent-unit identifying number based on the signal link included in the signal message. Also, when a unit receives a signal message including an adjacent-unit identifying number, the unit can determine a signal link based on the adjacent-unit identifying number.

(2) Addresses of units in relation to another unit are determined by the following method, with reference to FIG. 11 which explains the modifications of the destination address and the originating address.

In FIG. 11, the connection path from the unit A to another unit B can be made in only one way, because of the tree structure. A plurality of units $X_1, X_2, \ldots$, and $X_n$ are provided along the connection path. As shown in FIG. 11:

the adjacent-unit identifying number of the unit $X_1$ in relation to the unit A is $a_1$;

the adjacent-unit identifying number of the unit $X_2$ in relation to the unit $X_1$ is $a_2$;

the adjacent-unit identifying number of the unit $X_3$ in relation to the unit $X_2$ is $a_3$; and the adjacent-unit identifying number of the unit B in relation to the unit $X_n$ is $a_{n+1}$.

The address of each unit in relation to the unit under consideration is expressed by Nil.

The address of the destination unit in relation to a unit is expressed by a set of adjacent-unit identifying numbers of all of the units along the communication path, excluding the unit under consideration and including the destination unit. As a result:

the address of the unit B relation to the unit A is $a_1 a_2 \ldots a_n a_{n+1}$;

the address of the unit B in relation to the unit $X_1$ is $a_2 a_3 \ldots a_n a_{n+1}$; and the address of the unit B in relation to the unit $X_n$ is $a_{n+1}$.

Figure 12A:
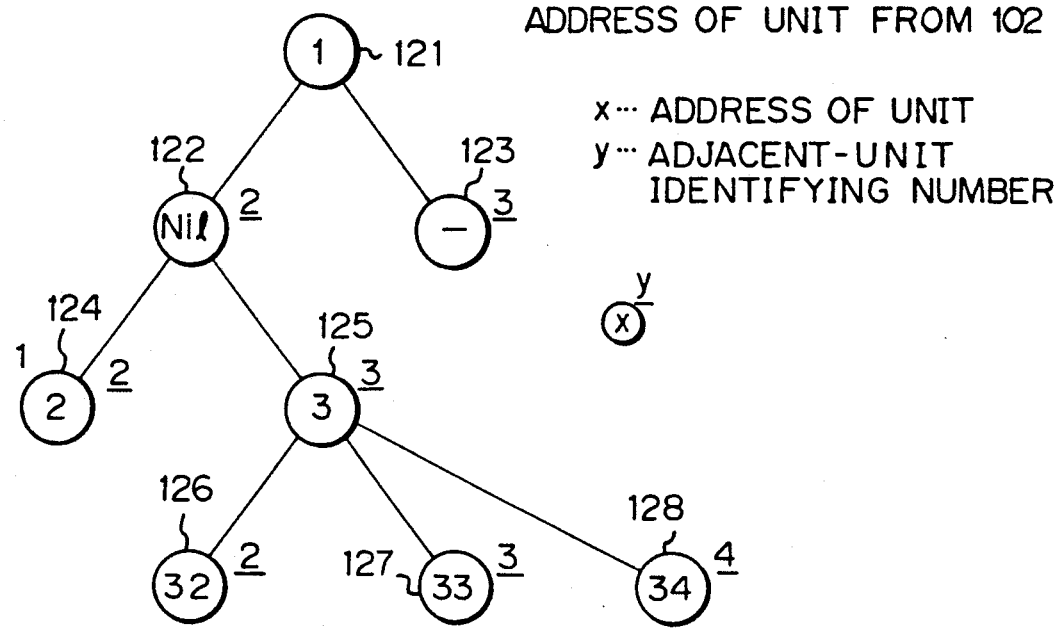
FIGS. 12A and 12B are diagrams explaining the relative address of each unit and adjacent-unit identifying number of each unit, according to an embodiment of the present invention.
Figure 12B:
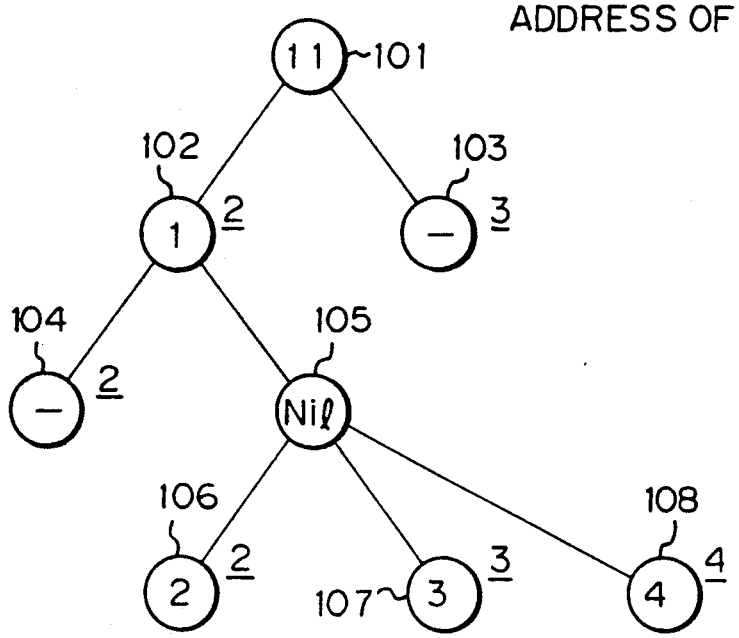

The address and the adjacent-unit identifying number of each unit determined in the above described method are illustrated as an example in FIGS. 12A and 12B, in which units 121 to 128 are connected in a tree structure.

FIG. 12A shows the address of each unit in relation to a unit 122, and FIG. 12B shows the address of each unit in relation to a unit 105. The numeral provided at the upper right of each unit represents an adjacent-unit identifying number in relation to the key unit thereof. The numeral provided within the circle representing each unit is the address of the unit. As will be seen from FIG. 12A, the address of the unit 127 in relation to the unit 122, for example, is "33" because the adjacent-unit identifying number of the unit 125 is "3", and the adjacent-unit identifying number of the unit 127 is also "3". The addresses of the other units are determined in a similar way.

On the other hand, in FIG. 12B, the address of the same unit 127 in relation to another unit 125 is "3". Thus, the address of each unit is different depending upon the relationship between each unit. This is a main feature of the present invention.

As described above, since the address of each unit is different depending upon the relationship therebetween, the originating address and the destination address must be modified in relation to each unit, when a message is transferred through a plurality of units. The modification of the originating address and the destination address is executed as follows.

(1) Modification of the originating address

When a unit receives a message, the unit brings the fixed address "1" to be included into the originating address included in the received message. Thus, the originating address is modified according to the relationship between the pre-stage unit and the unit which is receiving the message.

Alternatively, based on the accommodating position of the signal link, i.e., the communication-path identifying number, included in the received message, the originating address modification part * (see FIG. 8) determine the corresponding adjacent-unit identifying number based on the translation table (see FIG. 7) or a fixed logic. Then, the determined adjacent-unit identifying number is included in the originating address in the received message. The adjacent-unit identifying number newly introduced into the originating address is placed adjacent to the head number of a set of a series of adjacent-unit identifying numbers representing the received originating address, that is, adjacent to the most newly provided numeral.

(2) Translation of the destination address

Discrimination of whether the receiving unit is the destination unit or a relay unit provided along the path to the destination unit depends on whether or not the received destination address is Nil.

(3) Modification of the destination address

Based on the top end numeral of the destination address in the transferring message or relay message, that is, based on the most newly provided numeral in the destination address, the corresponding signal link connected to a unit to which the message is to be transferred is determined based on the translation table (see FIG. 7) or a fixed logic. Then, the top-end numeral is deleted from the destination address.

The above-mentioned address modification will be more apparent from the following description with reference to FIG. 13, which shows a principle of the address modification.

In FIG. 13, $a_1$ is the adjacent-unit identifying number of the unit $X_1$ in relation to the unit A; $a_2$ the adjacent-unit identifying number of the unit $X_2$ in relation to the unit $X_1$; . . . and $a_{n+1}$ is the adjacent-unit identifying number of the unit B in relation to the unit $X_n$.

Similarly, $b_1$ is the adjacent-unit identifying number of the unit A in relation to the unit $X_1$; $b_2$ is the adjacent-unit identifying number of the unit $X_1$ in relation to the unit $X_2$; . . . ; and $b_{n+1}$ is the adjacent-unit identifying number of the unit $X_n$ in relation to the unit B.

It will be seen from the figure that the destination address is modified step by step. That is, the destination address in relation to the unit A is $a_1 a_2 \ldots a_{n+1}$; is $a_2 a_3 \ldots a_{n+1}$ in relation to the unit $X_1$; and is Nil in relation to the unit B. Therefore, the unit B is the destination unit.

On the other hand, the originating address of the unit A is modified step by step from Nil to $b_{n+1} b_n \ldots b_2 b_1$.

Figure 14:
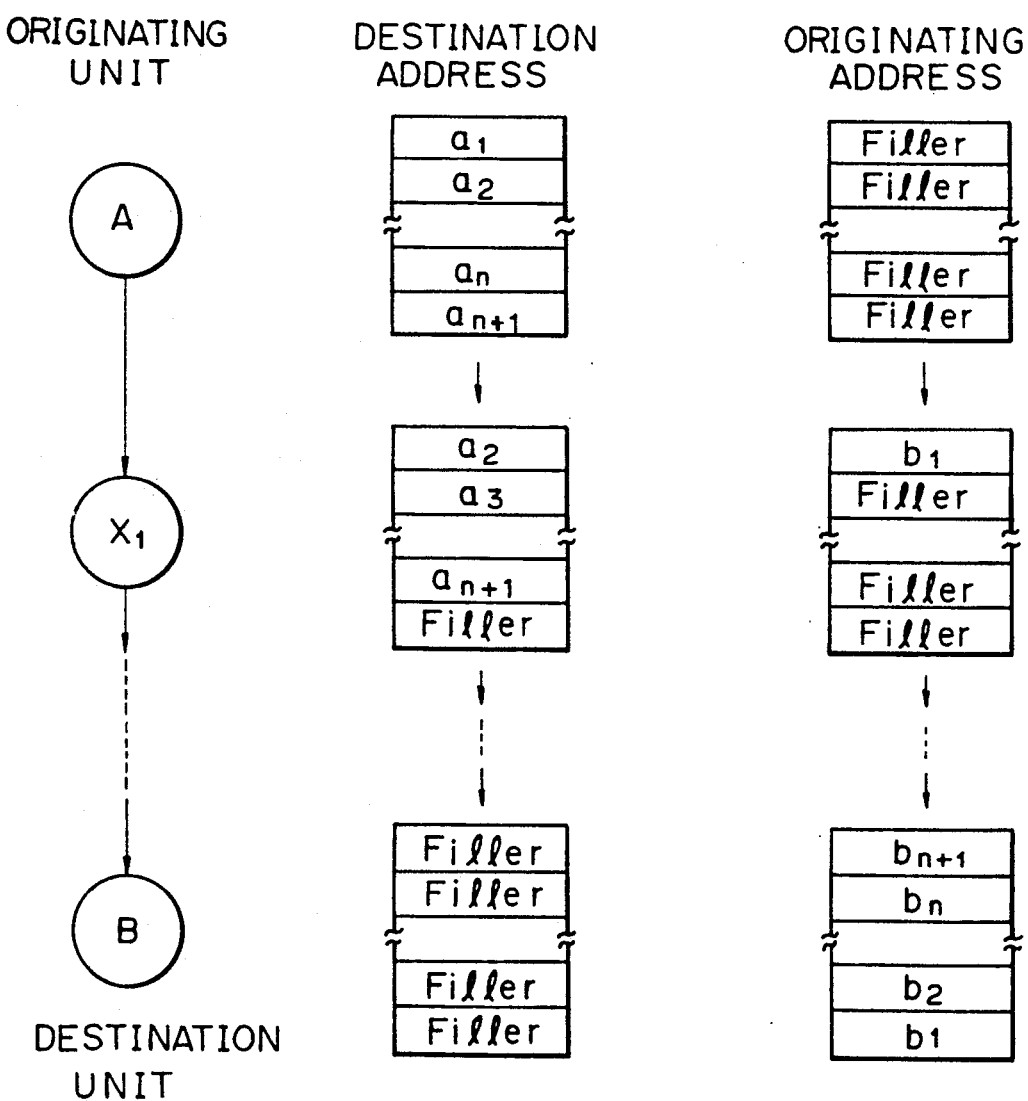
FIG. 14 is a diagram explaining an example of the address modification, according to an embodiment of the present invention.

FIG. 14 is a diagram explaining an example of the address modification.

In the realization of the address modification, Nil is realized by Fillers. The Filler is an address signal expressed by all "0"s. Thus, instead of a deletion of a numeral from a destination address, the numeral is replaced by the Filler. Also, instead of an addition of a numeral to an originating address, a Filler replaces the numeral. By employing the Filler, the efficiency of the processing of the address modification is improved. Also, the length of the destination address can be made the same as the length of the originating address. The length of the destination address is determined to be a necessary length for each message. These techniques also contribute to an improvement of the efficiency of the processing.

Figure 15:
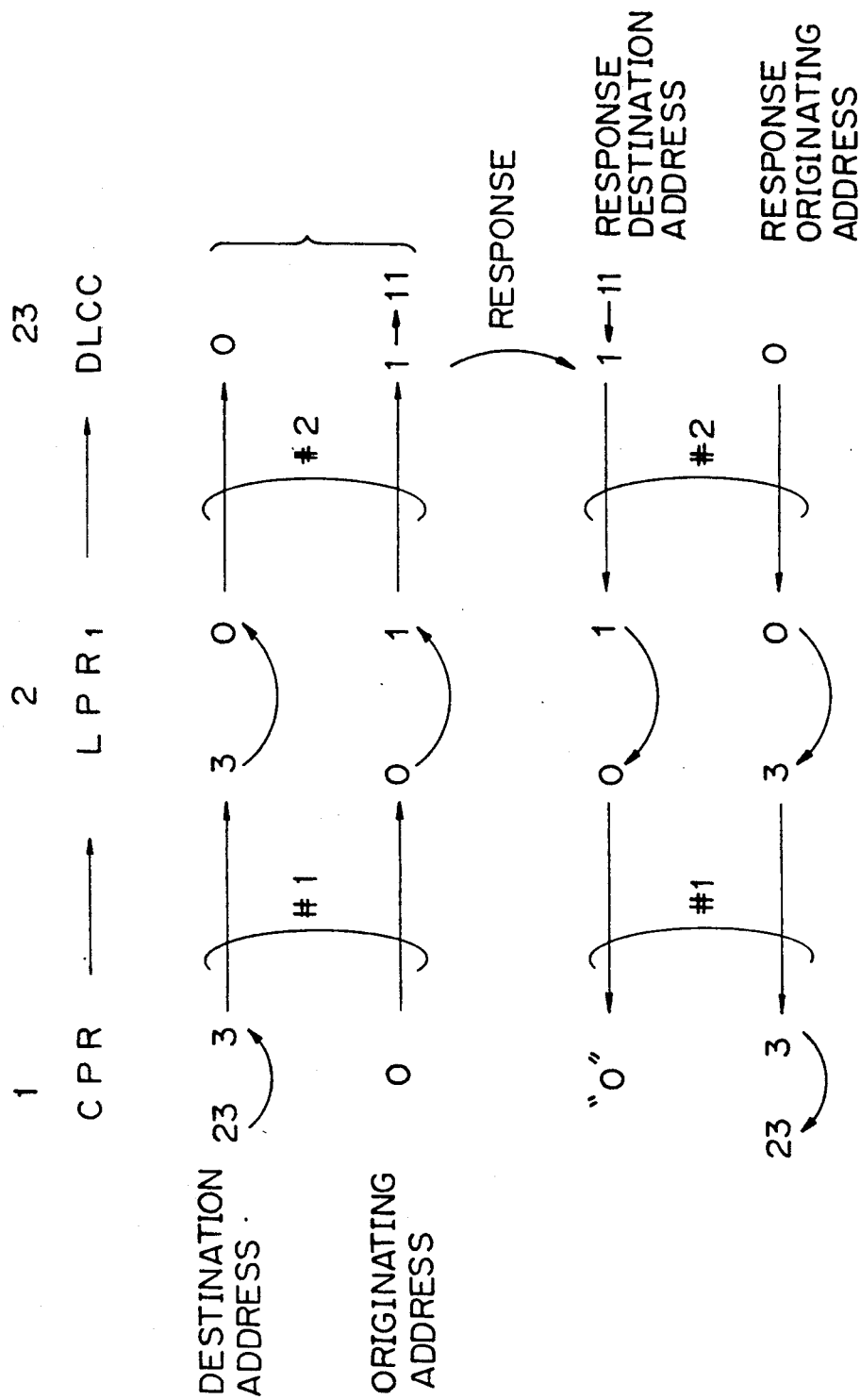
FIG. 15 is a diagram explaining the address modification in a response operation, according to an embodiment of the present invention.

FIG. 15 is a diagram explaining the address modification in a response operation, according to an embodiment of the invention.

In FIG. 15, in relation to the CPR, the adjacent-unit identifying numbers of the CPR and $LPR_1$ are "Nil" and "2", respectively. In relation to the $LPR_1$, the adjacent-unit identifying number of the $DLCC_2$ is "3". Therefore, in relation to the CPR, the destination address of the $DLCC_2$ is "23". The CPR generates the destination address "23", and output the modified destination address "3" by deleting the head number "2"from the original destination address "23". The $LPR_1$ receives the modified destination address "3" via a link #1 and outputs the further modified destination address "0". The $DLCC_2$ receives the destination address "Nil" via a link #2 and recognizes that the unit $DLCC_2$ is the destination unit because the received destination address is "0".

On the other hand, the originating address output from the CPR is "Nil", which is received by the LPR₁ via the link #1. The LPR₁ modifies the received originating address from "Nil" to "1", and this address is then received by the DLCC₂ via the link #2. The DLCC₂ modifies the address to "11".

When the DLCC₂ responds to the CPR, the DLCC₂ sends response information to the CPR. The response information includes a response destination address having the CPR as a destination, and a response originating address. The response destination address at the destination unit DLCC₂ is made equal to the received originating address "11" in this example. The DLCC₂ modifies the response destination address "11" to "1" and sends the modified address to the LPR₁ via the link #2. The LPR₁ modifies the received response destination address "1" to "Nil" and sends the modified address to the CPR via the link #1. Thus, the CPR receives the response destination address "Nil".

The response originating address at the destination unit DLCC₂ is "Nil", which is sent via the link #2 to the LPR₁. The LPR₁ modifies the received response originating address "Nil" to "3" based on the translation table by using the link #2 as a key. The modified response originating address "3" is sent via the link #1 to the CPR. The CPR modifies the received address "3" to "23" based on the table or the fixed logic by using the link #1 as a key.

From the foregoing description, it will be apparent that, according to the present invention, in a communication control system having a tree structure, a relative address is provided for each unit subject to the communication, and routing is executed based on the relative address. In each unit, whether or not the received message should be terminated at the unit under consideration is determined by merely depending on whether or not the received destination address is Nil. Therefore, the conventional complex translation of the destination address is not needed. Further, even when a new unit on a new office is introduced into the system, the correspondence between each unit and the line does not need modification except for the units adjacent to the newly introduced unit or office. Thus, the system designer can perform the system design very easily. Note, the present invention is not restricted to the application to communication between units in an exchange office, but is also applicable to communication between exchange offices.

We claim:

1. A communication system for communication between an originating unit and a destination unit through a plurality of relaying units, wherein:

said originating unit, said plurality of relaying units and said destination unit are each provided with an adjacent originating address when viewed from a lower adjacent unit in the communication route, and an adjacent destination address when viewed from an upper adjacent unit in the communication route;

said adjacent originating address being different from said adjacent destination address;

said adjacent destination address being different from other adjacent destination addresses provided at units connected to said upper adjacent unit for identifying said units;

said originating unit comprising:

destination address forming means for forming a destination address for specifying said destination address; and signal message sending means, operatively connected to said destination address forming means, for sending a signal message and said destination address to a lower adjacent unit in the communication route in accordance with said destination address;

said destination address being represented by a set of adjacent destination addresses of all lower units provided on the communication path between said originating units and said destination unit;

each of said relaying units comprising:

address receiving means for receiving an originating address and a destination address from an upper adjacent unit adjacent to the unit receiving said message signal; and signal message routing means, operatively connected to said address receiving means, for sending said signal message to a lower adjacent unit in the communication route and adjacent to the unit receiving said signal message in accordance with the received destination address;

said signal message routing means comprising:

destination determining means, for discriminating whether the received destination address includes data for determining that the unit receiving said signal message is said destination unit when said received destination address includes no data;

address changing means, operatively connected to said address discriminating means, for changing said received originating address to a new originating address by adding said adjacent originating address to said received originating address and for changing the received destination address to a new destination address by deleting said adjacent destination address of an upper unit adjacent to the unit receiving said message signal from the received destination address; and path selecting means for selecting, based on the changed destination address, a path for transferring the changed originating address and the changed destination address to said lower adjacent unit, when said destination address includes any data.

2. A communication system as claimed in claim 1, wherein each of said originating unit and said relaying units further comprise a translation table for storing said adjacent destination address and a path-identifying number corresponding to said adjacent destination address, said path being selected by using, as a key in said translation table, said adjacent destination address in said destination address.

3. A communication system as claimed in claim 1, wherein each of said originating unit and said relaying units further comprise calculating means for determining said path by adding a constant value to or by subtracting a constant value from said adjacent destination address in said destination address.

4. A communication system as claimed in claim 1, wherein each of said originating unit and said plurality of relaying units has a self address equal to "Nil" meaning no data, and said adjacent originating address being equal to "1".

5. A communication system as claimed in claim 4, wherein each of said relaying units comprises a response means for sending response information to said originating unit, said response information including a response destination address for specifying said originating unit as a response destination, said response destination address being equal to said received originating address.

6. A communication system as claimed in claim 5, wherein said response destination address being a set of "1"s, the number of said "1"s being equal to the number of the relaying units between the responding unit and said originating unit, excluding said responding unit and including said originating unit.

7. A communication system as claimed in claim 5, wherein each of said originating unit and said relaying units further comprises a translation table for storing said adjacent destination address and a path-identifying number corresponding to said adjacent destination address, said path being selected by using said adjacent destination address in said destination address as a key in said translation table.

8. A communication system as claimed in claim 7, wherein said response information includes a response originating address and a received path-identifying number, said response originating address generated from said responding unit being "Nil", each of said relaying units comprising a response originating address modification means for generating a modified response originating address by adding a number to the received response originating address, said number being obtained from said translation table by using said received path-identifying number as a key for translation.

9. A communication system as claimed in claim 5, wherein each of said originating unit and said relaying units further comprises calculating means for determining said path by adding a constant value to or by subtracting a constant value from said adjacent destination address in said destination address.

10. A communication system as claimed in claim 8, wherein said response information includes a response originating address and a received path-identifying number, said response originating address generated from said responding unit being "Nil" meaning no data, each of said relaying units comprising a response originating address modification means for generating a modified response originating address by adding a number to the received response originating address, said number being obtained by said calculating means by adding a constant number to or by subtracting a constant number from said received path-identifying number.

11. A communication system as claimed in claim 2, wherein said communication system is an exchange system further comprising a call processing unit for controlling a network; a line processing unit under the control of said call processing unit and provided to corresponding to a plurality of subscriber lines; and a line control unit under the control of said line processing unit, for controlling each of said subscriber lines;
said call processing unit being said originating unit, and said line processing unit and said control unit being said plurality of relaying units.

12. A communication system as claimed in claim 3, wherein said communication system is an exchange system further comprising a call processing unit for controlling a network; a line processing unit under the control of said call processing unit and provided to corresponding to a plurality of subscriber lines; and a line control unit under the control of said line processing unit, for controlling each of said subscriber lines;
said call processing unit being said originating unit, and said line processing unit and said control unit being said plurality of relaying units.

13. A communication system as claimed in claim 4, wherein said communication system is an exchange system further comprising a call processing unit for controlling a network; a line processing unit under the control of said call processing unit and provided to corresponding to a plurality of subscriber lines; and a line control unit under the control of said line processing unit, for controlling each of said subscriber lines;
said call processing unit being said originating unit, and said line processing unit and said control unit being said plurality of relaying units.

14. A communication system as claimed in claim 7, wherein said communication system is an exchange system further comprising a call processing unit for controlling a network; a line processing unit under the control of said call processing unit and provided to corresponding to a plurality of subscriber lines; and a line control unit under the control of said line processing unit, for controlling each of said subscriber lines;
said call processing unit being said originating unit, and said line processing unit and said control unit being said plurality of relaying units.

* * * * *

UNITED STATES PATENT AND TRADEMARK OFFICE
CERTIFICATE OF CORRECTION

PATENT NO. : 5,077,554

DATED : December 31, 1991

INVENTOR(S) : Akira Orita et al.

It is certified that error appears in the above-identified patent and that said Letters Patent is hereby corrected as shown below:

```
Title Page, [57] ABSTRACT
      line 5, ""nil"" s/b --"Nil"--;
      line 12, ""nil"," s/b --"Nil",";
      line 15, ""nil"," s/b --"Nil",--.
Col. 5, line 45, ""1";" s/b --"Nil";--.
Col. 7, line 29, "(SCCP)2, 422" s/b
--(SCCP)412, 422--;
Col. 12, line 65, ""0"." s/b --"Nil".--;
         line 68, ""0"." s/b --"Nil".--.
```

Signed and Sealed this

Fourth Day of May, 1993

Attest:

MICHAEL K. KIRK

Attesting Officer

Acting Commissioner of Patents and Trademarks